United States Patent
Basista et al.

[11] 3,948,584
[45] Apr. 6, 1976

[54] HIGH SPEED LENS HAVING SHORT BACK FOCUS AND COMPACT REAR MEMBER

[75] Inventors: Heinrich Basista, Oberkochen; Bernhard Sonnenberg, Heidenheim-Schnaitheim, both of Germany

[73] Assignee: Carl Zeiss-Stiftung, Carl Zeiss, Heidenheim on the Brenz, Germany

[22] Filed: Mar. 25, 1974

[21] Appl. No.: 454,321

[30] Foreign Application Priority Data
   Mar. 27, 1973  Germany............................ 2315071

[52] U.S. Cl. ................. 350/214; 350/176; 350/215; 350/218
[51] Int. Cl.² .... G02B 9/60; G02B 9/62; G02B 9/64
[58] Field of Search ............ 350/214, 215, 216, 218

[56] References Cited
   UNITED STATES PATENTS
   3,761,161   9/1973   Nakagawa........................... 350/218
   3,817,603   6/1974   Takahashi........................... 350/218
   FOREIGN PATENTS OR APPLICATIONS
   36,797   11/1970   Japan................................ 350/218

*Primary Examiner*—John K. Corbin
*Attorney, Agent, or Firm*—Stonebraker, Shepard & Stephens

[57] ABSTRACT

A high speed lens of the type sometimes called a quasitelephoto lens, having a very short and compactly constructed rear member, and having a relative aperture in the range of about $f/2$ to $f/1.4$. The lens is intended particularly for installation in a 35 millimeter reflex camera. The back focus is sufficiently great to allow room for the swinging of a reflex mirror. The central space between the front member and the rear member is sufficiently large to allow room for installation of a diaphragm or an objective shutter, or both, in this space. Rules or conditions are stated which, if followed, will enable the production of lenses having the characteristics above mentioned, at the same time having a very high quality of photographic performance. Detailed data are given for eleven specific examples.

14 Claims, 5 Drawing Figures

HIGH SPEED LENS HAVING SHORT BACK FOCUS AND COMPACT REAR MEMBER

BACKGROUND OF THE INVENTION

The invention relates to high speed lenses or objectives, useful particularly but not exclusively in photography. Many forms of such lenses are known in the art. The lenses of the present invention are of the type sometimes referred to as quasi-telephoto lenses, having a very short and compactly constructed rear member, the lens as a whole being a relatively high speed lens with a relative aperture in the range of about $f/2$ to $f/1.4$.

The lenses of the present invention are intended particularly for installation in a 35 millimeter reflex camera. The present invention provides a sufficiently great back focus (axial distance from the rear vertex of the rear element of the lens to the focal plane or film plane when focused at infinity) to allow room for swinging a reflex mirror, as necessary in a camera of this type.

Also, the lens construction according to the present invention provides a central space between the front member and the rear member of the lens, sufficiently great to permit the installation at this point of a diaphragm (preferably a diaphragm of adjustable aperture, such as a conventional iris diaphragm), or an objective shutter, or both a diaphragm and a shutter, if desired. Of course the lens of the present invention is not limited to use with an objective shutter (often also called a central shutter, or a lens shutter), and it is immaterial so far as the present invention is concerned, whether the camera associated with this lens is equipped with an objective shutter or with a focal plane shutter.

SUMMARY OF THE INVENTION

A lens of reasonably long focal length, such as what is called a quasi-telephoto lens, intended for use with a 35 millimeter camera, must have the rear member of the lens (behind the diaphragm space or shutter space) constructed very compactly, with a relatively short axial length of the rear member, in order that the rear vertex of the rear member will be sufficiently far from the focal plane or film plane when the lens is focused upon an object at infinity distance, so as to allow room for swinging the reflex mirror of the camera from viewing position to picture taking position and vice versa. The present invention provides lenses which fulfill this condition and which, therefore, are particularly suitable for use in cameras of this kind. Of course the lenses of the present invention are useful also in other kinds of cameras, and are not restricted to use with 35 millimeter cameras of the pivoted reflex mirror type, but an important feature of the invention resides in the fact that lenses according to the present invention are eminently suitable for use with such cameras, whereas many lenses of the prior art, although excellent in other respects, are not suitable for use with cameras of the kind above specified. The present invention provides a fast or high speed lens of moderately long focal length for use as a quasi-telephoto lens, of high image quality, free of serious aberrations. The lens of the present invention overcomes certain difficulties and disadvantages inherent in the prior art lenses intended for the same purpose. Among these disadvantages may be mentioned that the prior art lenses for the same purpose are now provided with a very strong constriction of the cross section of the light beam, which constriction progresses from the front toward the diaphragm. This constriction, based on technical camera requirements, is usually accompanied by unacceptably large aberrations of high order, as a result of which the picture quality is very unfavorably affected, particularly in the case of long-focus systems.

These disadvantages of the prior art are for the first time substantially eliminated by the new principle of construction in accordance with the present invention. The new lenses are constructed of at least five components air spaced from each other, although some of the components may be made of two or more lens elements cemented to each other. Of these components, at least three are in the front member of the lens (forwardly of the central space for the diaphragm or shutter or both) and at least two components are in the rear member of the lens (behind the central space).

In the front member (designated in the drawings by Vgl, standing for the German word Vorderglied) the first or front component A and the second component B both have a condensing lens refractive power (surface power sum) and behind them there is the third component C. The rear surface of this thrid component is concave toward the rear, and defines both the total condenser-acting front member and also the central vertex distance or central space CS in which a diaphragm may be placed, preferably a diaphragm of adjustable aperture, such as an iris diaphragm. A shutter may be used with the diaphragm, or a combined diaphragm and shutter of known form may be used, that is, a shutter which opens only to a predetermined adjustable extent, thus acting as a diaphragm as well as a shutter when making the photographic exposure.

Behind the central space is the rear member (designated in the drawings as Hgl, standing for the German word Hinterglied) has at least two components, designated as D and E but each component may be made of two or more individual elements cemented to each other. The front component of the rear member is a meniscus shaped component concave toward the front, the front surface of this component defining the rear of the central space or diaphragm space. This component is followed by the last or rearmost component of the lens, which is preferably an unequal-sided positive member. The back focus, that is, the axial distance from the rear vertex of this last component E to the image plane when the lens is focused on an object at infinity distance, is preferably between 0.385 and 0.520 times the equivalent focal length F of the entire lens system, in order to permit the technical use of particularly favorable installation conditions in a modern 35 millimeter camera. This back focus is indicated, in some of the information given below, by the designation $s'$.

Investigations in connection with making this invention indicate that, in order to achieve the desired results, the above mentioned components should be so designed that they fulfill simultaneously all of the following rules or conditions stated below as features 1 through 5.

Feature 1. The paraxial refractive power $\Phi_{Vgl}$ of the entire front member Vgl is positive, and is within the limits of 0.28 times and 0.61 times the equivalent refractive power $\Phi$ of the entire lens system comprising the front member and rear member together.

Feature 2. Within the front member, there is an air lens $\beta$ of diverging or negative power, defined by the rear surface of the second component B and the front surface of the third component C. This negative air lens is so dimensioned that the sum of the surface powers $\phi\beta$ of the two neighboring surfaces defining the air lens is, in its negative value, within the limits of 0.326 times and 0.612 times the equivalent power of refraction $\Phi$ of the entire lens system.

Feature 3. The positive component B in the intermediate position in the front member is a meniscus convex toward the front, and is so dimensioned that its Gardner curvature number $\delta_B$ is positive and is within the limits of 1.735 and 3.675. Moreover, this meniscus component B has a surface power sum $\phi_B$ which is within the limits of 0.690 times and 1.070 times the equivalent refractive power $\Phi$ of the entire lens system.

Feature 4. The first two components A and B of the front member are so dimensioned relative to each other that their refractive power distribution factor $\Psi_{BA}$ is within the limits of 0 (zero) and 0.205. This refractive power distribution factor is the quotient of the difference in their respective surface power sums $\phi_B - \phi_A$ divided by the sum of their surface power sums $\phi_B + \phi_A$.

Feature 5. The above mentioned negative air lens $\beta$ between the components B and C is so dimensioned that its Gardner curvature number sigma specifically at this locus of action of maximum positive refractive powers and strong light-ray constriction is shifted into a small finite range of positions provided with a positive sign, between the limits of + 0.834 and + 2.285.

With regard to these features above mentioned, it may be pointed out in detail that if the lower limit specified in feature 1 for the refractive power of the front member is exceeded in a negative direction, then an extremely strong positive excess of refractive power must be amassed, which would lead to an extremely unfavorable total condition of aberration, which is entirely incompatible with the purpose of the invention. On the other hand, if the upper limit specified for this feature 1 is exceeded, this leads to just as unfavorable an accumulation of positive refractive power effects in the front member, the increase of which would also result in a perceptible reduction in the photographic performance of the entire lens. In order to counteract in principle the occurrence of such injurious accumulations of aberration in the front member, there is provided, in accordance with above mentioned feature 2, a strongly diverging air lens $\beta$ between the individual positive component B and the following individual negative component C. By dimensioning this air lens $\beta$ to have a surface power sum within the limits above mentioned in connection with feature 2, the result is achieved that, when the lower limit is not exceeded, the air lens has a dioptric compensatory effect which is sufficiently large in line with the purpose in view with respect to the course of the aberration. Furthermore, by not exceeding the upper limit above specified for this surface power sum, one avoids two strong a compensatory influence on the course of aberration, with the consequence thereof for increasing the aberrations of higher order.

During the course of the investigations which led to the present invention, it was furthermore found that, contrary to the teaching of the prior art, the dimensioning of the positive inner component B, both with respect to its refractive power, and with respect to its curvature, has a previously unrecognized importance. For the first time in this art, the present invention takes advantage of these factors in forming a high speed lens of short back focus. For this purpose, the component B is shaped as a meniscus having convex curvature toward the front, and having a Gardner curvature number within the range above stated in the initial outline of feature 3. At the same time, this component B is provided, in distinction to prior art lenses of similar sub-type, with a surface power sum which is maintained specifically small, and within the clearly defined numerical limits above specified in feature 3.

This relatively small lens refractive power $\phi_B$ for the obtaining of a definite reduction of the aberrations of higher order in the wide aperture lateral ray pencils also has the surprising advantage of enabling the lens refractive powers of the second component B and the first component A to have such a finely balanced distribution of refractive power relative to each other, that their reciprocal refractive power distribution factor $\Psi_{BA}$ is shifted into the range above specified in the initial discussion of feature 4. If the upper limit of this range is exceeded, this may result in an undesired increase of the zonal intermediate defects of the spherical aberrations in connection with these high speed lenses, primarily in the central parts of the image field. Therefore, in the interest of a low zone correction, the numerical limits above specified for feature 4 should be adhered to. The same is true of the above mentioned feature 5, relating to the numerical limits of the Gardner curvature number $\delta\beta$ of the air lens $\beta$ between the components B and C. At the same time, keeping this Gardner curvature number within the limit specified, permits a substantial reduction of the percentage of comatic asymmetric defect and also the spherical aberration portion of defect in the coma in the lateral parts of the image. This advancing curvature is characterized by the numerical position range of the Gardner curvature number (sigma) of this air lens $\beta$.

This curvature number, usually identified by the Greek letter sigma, is understood in the art, and is explained in the publication by I. C. Gardner, "Application of the algebraic aberration equations to optical design," published by the Bureau of Standards in Washington, D.C., in 1927, in Scientific Paper no. 550, pages 82 et seq.

The above discussed features 1 through 5 embody the rules or conditions which should be followed in order to produce an acceptable lens for the above outlined purposes of the present invention. There are some additional features or rules which may be disregarded while still producing an acceptable lens, but which, if followed, will result in some improvement of the lens. These additional features are discussed below as features 6 and 7.

Feature 6. For better results, the front component A of the front-member of the lens should be so dimensioned that the surface power sum $\phi_A$ of this first component is more than 1.045 times the equivalent refractive power of the entire lens system. By doing this, it is possible to realize a particularly favorable structural dimensioning both of the front member Vgl of the lens and of the entire lens as a whole, while at the same time maintaining the desired strong constriction of the rays in the vicinity of the diaphragm space, and likewise fully maintaining the advantageous increase in the total picture performance which is made possible by the new principle of construction of the lens of the present invention, this increase in performance being over the entire useful field of view, and being both surprising and important. However, this surface power sum of the first component should preferably not exceed an upper limit value of 1.417 times the equivalent refractive power of the entire lens. At the same time, the designer should avoid the use of extreme types of glass, without having to tolerate a noticable increase in the aberrations of higher order in the wide aperture pencils of rays.

It should be pointed out that it lies within the scope of the present invention to split the front component into two elements and develop it as a doublet. Such splitting is known in the art, being disclosed, for instance, in example I of German Pat. No. 428,657, the Ernostar patent. The teaching of this patent applies particularly to the different types of photographic lenses described in the patent, but nevertheless it constitutes a definite teaching of a manner of technical action with respect to splitting per se.

Feature 7. It is particularly advantageous, for reasons of installation in the camera, that a high speed lens of the general type here under discussion should have a total axial length, from the front vertex of the first component to the rear vertex of the last component, which is less than two-thirds of the equivalent focal length of the lens, and at the same time, that the back focus of the lens (that is, the axial distance from the rear vertex of the last component to the image plane when the lens is focused at infinity) should be not less than 0.495 times the equivalent focal length F of the entire lens, in spite of the relatively short structural length of the lens. This is particularly useful when the lens is for the popular small picture size of 24 × 36 millimeters and has a focal length F lying within the range of about 120 to 140 millimeters.

According to feature 7 of the present invention, these proportions just mentioned can be best achieved by making the meniscus shaped front component of the rear member (that is, the component immediately behind the diaphragm space) concave toward the front, and giving it such a diverging and strongly over-correcting paraxial refractive power of its own ($\Phi_D$) which, in its negative value, is within the range of 0.546 times and 0.767 times the equivalent refractive power $\Phi$ of the entire lens. This should preferably be done regardless of whether the component D is an individual element or whether it is developed as a doublet. This additional rule of dimensioning makes it possible not only to maintain the advantageous increase in the quality of the picture obtained by the new principle of construction, but also at the same time to obtain a very small axial length of the rear member Hgl, measured along the optical axis from the first vertex surface to the last vertex surface of the rear member.

The above mentioned 7 features or rules or conditions of construction can be expressed in mathematical formulae as follows:

$$
\begin{aligned}
0.28\,\Phi &< \Phi_{Vgl} < 0.61\,\Phi & (1) \\
0.326\,\Phi &< -\phi_B < 0.612\,\Phi & (2) \\
1.735 &< \delta_B < 3.675 & (3a) \\
1.070\,\Phi &> \phi_B > 0.690\,\Phi & (3b) \\
0 &\leq -\psi_{BA} < 0.205 & (4) \\
0.834 &< \delta_B < 2.285 & (5) \\
&\phi_A > 1.045\,\Phi & (6) \\
0.546\,\Phi &< -\Phi_D < 0.767\,\Phi & (7)
\end{aligned}
$$

DESCRIPTION OF THE PREFERRED EMBODIMENTS

Eleven specific examples of lenses in accordance with the present invention are disclosed in detail below. All of them are dimensioned in accordance with the principles or rules of construction set forth above as features 1 through 5. Some but not all of the examples comply also with features 6 and 7.

In the tabular data given below in connection with the disclosure, as well as in the claims, all linear dimensions (e.g., radii, thicknesses, and spacings) are given, not as absolute dimensions, but on the basis of the equivalent focal length of the entire lens assembly or system as unity; that is, $F = 1.00$. The radii of curvature of the front surface and the rear surface of each component or element are indicated by R and R', respectively, with a subscript indicating the number of that particular component or element. When any component is made up of more than one element, the front element of the component is designated by the number of the component plus the letter $a$, and the rear element of the component is designated by the number of the component plus the letter $b$. Positive values of R or R' indicate surfaces convex toward the front of the lens. The front of the lens is the end toward the distant object, and the rear of the lens is the end toward the camera, the image of object being formed behind the rear of the lens. In accordance with the conventional practice in lens patents, the left end of the lens as illustrated in the drawings is the front, the right end is the rear or back, and the light is assumed to enter the left or front end of the lens and travel rightwardly through the lens.

Axial thicknesses are indicated, in the data tables, by the letter T with subscript indicating the particular component or element, and axial spacings are indicated by the letter S with a subscript indicating the particular component or element which is at the front of the space referred to. Zero spacing in the tables indicates lens elements cemented to each other, even though the drawings may show such elements are being separated from each other, for the sake of clarity of illustration. All spacings greater than zero refer to air spacings.

The index of refraction of the glass used for each element is given in the column headed N. When a lens is designed for use with only a very narrow spectral range, the refractive index refers specifically to this narrow spectral range. If the lens is to be used over a wide spectral range, as for example in a normal color photography, the index of refraction refers to any suitable one of the standard indices of refraction, for example, the index with reference to the yellow d-line of the visible helium spectrum, whose wavelength is 5876 Angstrom units. The refractive index based on this line is shown in many commercial catalogues of manufacturers of optical glasses. The use of the index of refraction based on this yellow d-line is quite satisfactory especially when developing the so-called preform for the high speed quasi-telephoto lenses of the present invention. In the course of subsequent technical rough shaping or rough forming, the initial correction normally customary in the Seidel range (third order) is employed.

As a matter of convenience, the overall length of the lens (from front vertex of first component to rear vertex of last component) is indicated by the symbol OAL, and the length of the rear member (axial length from front vertex of the first component of the rear member to rear vertex of the last component of the rear member) is indicated by the symbol RML, in some of the tables. The back focus is indicated by the symbol $s'$. As above mentioned, these dimensions, like all other linear dimensions, are based on the equivalent focal length F as unity. The maximum effective working aperture of the lens is indicated by $f$.

It should be mentioned that the drawings or lens diagrams are not intended to be exactly to scale, but only to show the general configuration of the lens. Thus one figure of the drawings may serve to illustrate more than one example, even though there may be differences in the radii, thicknesses, and spacings of one example as compared with another example illustrated by the same view.

In all five figures of the drawings, illustrating schematically the eleven examples, the three components of the front member Vgl are indicated both by the letters A, B, and C, and the Roman numerals, I, II, and III. Similarly, the two components of the rear member Hgl are indicated by the letters D and E as well as the Roman numerals IV and V. The individual lens elements are indicated by the Arabic numerals 1 through 5, with the further provision that where a single component is made up of two elements, both elements of the component bear the same number, distinguished by the addition of the letter $a$ or $b$, respectively. In each figure, the diverging air lens $\beta$ between the individual components B and C has been particularly emphasized.

In FIGS. 1-4, certain components are shown as separate individual lenses, for clarity of illustration. But in known manner, they can be simplified to a compound lens, dimensioning the two inner neighboring radii with equal length and equal sign and thus converting them into a pair of cemented surfaces, as indicated in the data tables by a spacing of zero.

A few comments regarding the examples will be given at this point, before proceeding with the data tables themselves.

Figure 1:
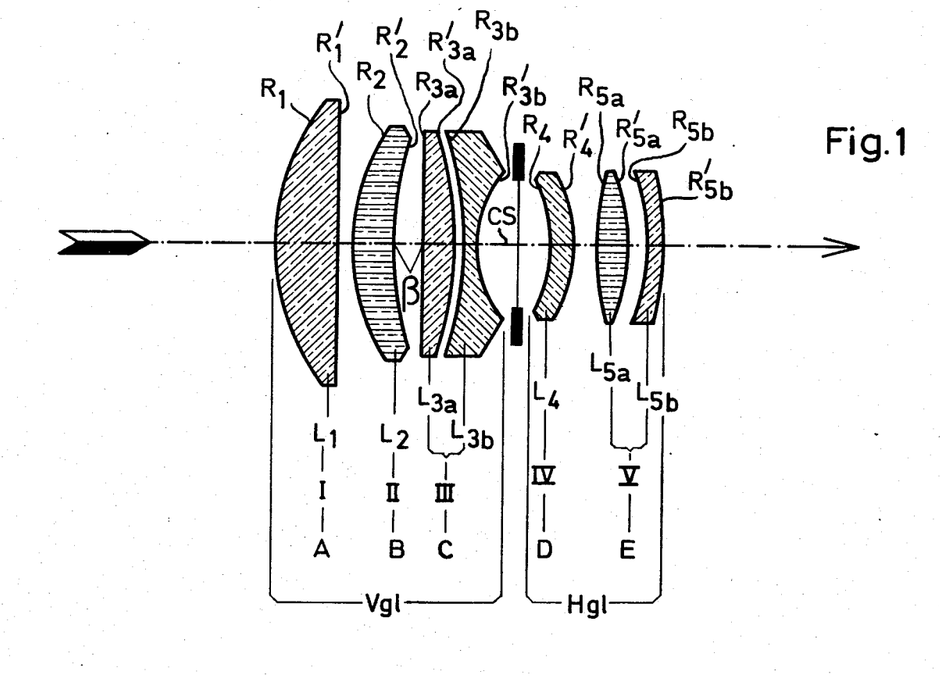
FIG. 1 is a schematic diagram illustrative of a lens in accordance with one embodiment (example 1) of the invention.

Example 1, illustrated in FIG. 1, first of all gives an initial form of lens for monochromatic light, in which both the last component of the front member (that is, component C) and the last component of the rear member (that is, component E) are developed as composite structures. The components A and B in the front member and the component D in the rear member, are developed as individual lens elements, surrounded on both sides by the fluid, air. This example is intended as a preform for a lens having a relative aperture of $f/1.9$ for photographing single color signals over a picture angle of about 20°.

Figure 2:
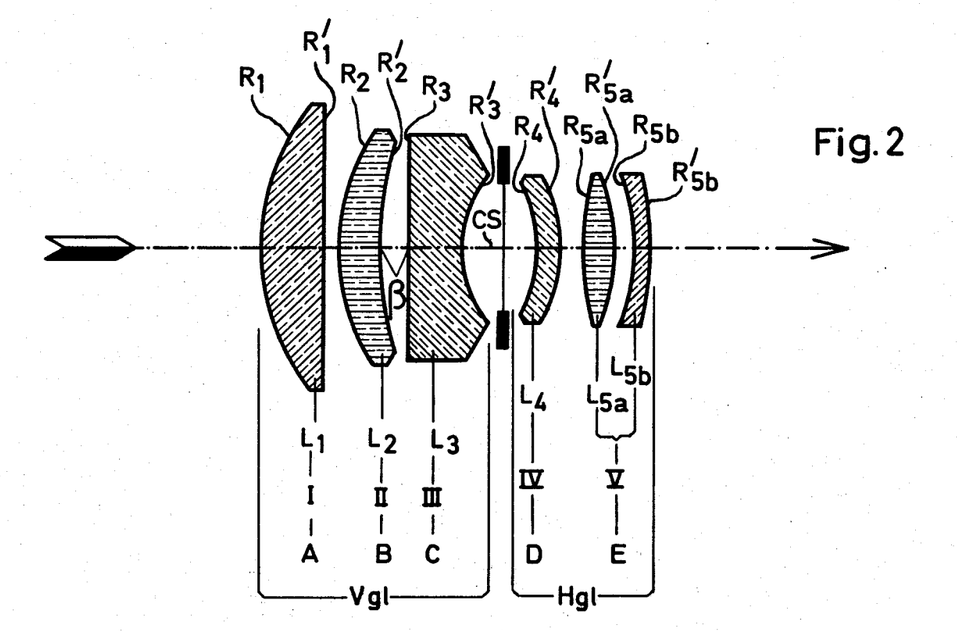
FIG. 2 is a similar diagram illustrative of a lens in accordance with another embodiment (example 2) of the invention.

In Example 2, illustrated in FIG. 2, there is given an embodiment which has been precorrected monochromatically in the Seidel range, and which has been simplified as compared with Example 1, in that all three components of the front member are developed as individual lens elements. With this structural shape in accordance with the invention, the front component A is substantially flatter than in Example 1, and at the same time the lens is provided for a relative aperture of $f/1.7$.

Figure 3:
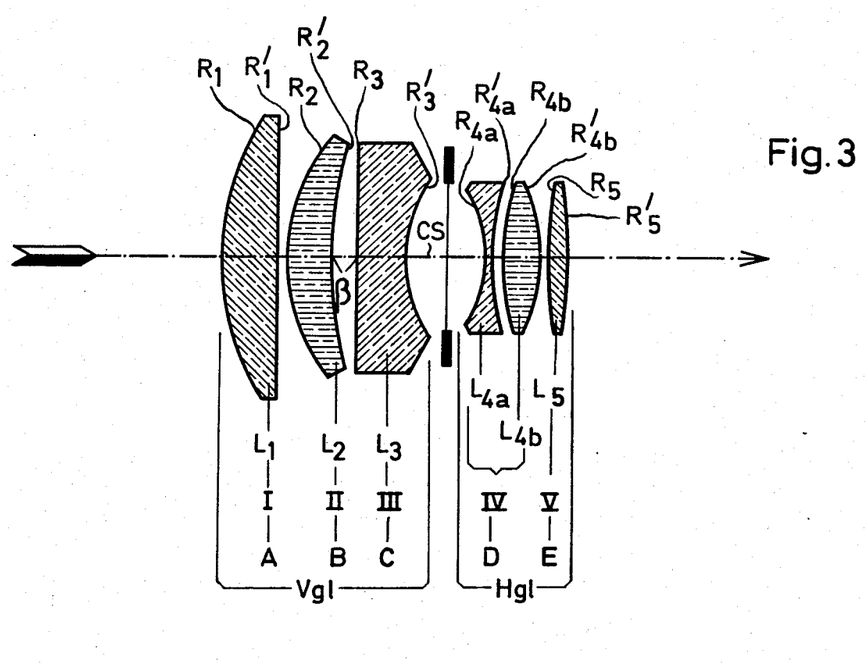
FIG. 3 is a similar diagram illustrative of lenses in accordance with other embodiments (examples 3 and 4) of the invention.

Example 3, illustrated in FIG. 3, is also a structural form which has been precorrected monochromatically in the Seidel range, and which is intended for a picture angle of 25°. As distinguished from Examples 1 and 2, component D (the first component in the rear member) is here developed as a composite component of two individual lenses of opposite sign which together form, as a whole, a meniscus which is concave toward the front and which, by itself, has a condensing parallax refractive power.

Example 4, also illustrated schematically in FIG. 3, is a similar structural shape, intended for a relative aperture of $f/1.5$ and an angle of view of 26°.

Figure 4:
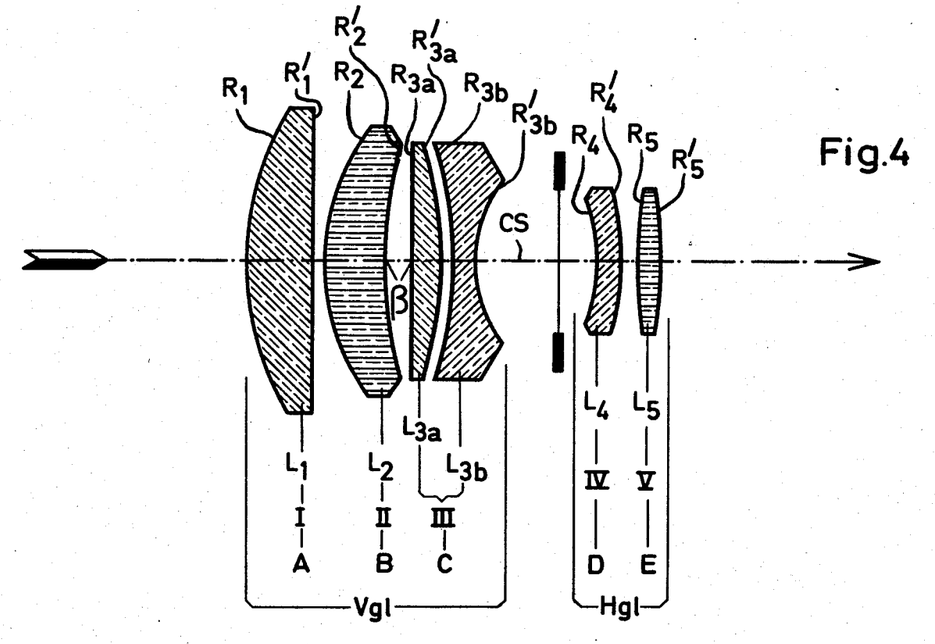
FIG. 4 is a similar lens diagram illustrating lenses in accordance with other embodiments (examples 5 and 10) of the invention.

Example 5, illustrated schematically in FIG. 4, is a lens having a relative aperture of $f/1.6$ and intended for photoelectronic photography in a very narrow spectral range. In this embodiment the last component C of the front member is a compound structure composed of two lens elements of opposite sign. The front element of this component C is a planoconvex element, and the front component A of this lens is also a planoconvex lens.

These five examples 1-5 are all intended for use in a very narrow spectral range. But the remaining examples 6-11 are finely corrected lenses intended for the normally customary color photography. The data for these finely corrected lenses include not only the indices of refraction in the column headed N in the data tables, but also the indices of dispersion or Abbe numbers, in the columns headed V. By following the data in the tables for Examples 6-11, these lenses are achromatized for the required wide spectral range.

In the interest of the fullest possible disclosure, it may be pointed out that the rear member of the lens according to the present invention has the external shape of half of a Gauss lens, with front diaphragm. In distinction to the prior art, the front component D of the rear member of the lens of the present invention is not necessarily in the form of a meniscus of diverging action, concave toward the front (that is, toward the diaphragm space), particularly not when this meniscus is developed as a composite structure. Rather, such a meniscus member D can, in the last-mentioned case, be provided with a condensing action rather than a diverging action, as shown in present Examples 3 and 4. In both of these examples, the meniscus shaped component D has a condensing paraxial refractive power of its own, $\Phi_D$, so that each of these composite components utilizes a positive meniscus for technical use here.

Example 1. (FIG. 1)

| Lens | Radii | | $F = 1.0000$ | $f/1.8$ Thicknesses and Spacings | $s' = +0.4556\ F$ N |
|---|---|---|---|---|---|
| 1 | $R_1$ | $= +0.596$ | | $T_1 = 0.1365$ | 1.651 |
|  | $R'_1$ | $= +5.431$ | | $S_1 = 0.0023$ |  |
| 2 | $R_2$ | $= +0.473$ | | $T_2 = 0.1156$ | 1.651 |
|  | $R'_2$ | $= +1.175$ | | $S_2 = 0.0300\ (\beta)$ |  |
| 3a | $R_{3a}$ | $= +6.548$ | | $T_{3a} = 0.0983$ | 1.785 |
|  | $R'_{3a}$ | $= -0.627$ | | $S_{3a} = 0.00$ |  |

Example 1. (FIG. 1)-continued

| Lens | Radii | | Thicknesses and Spacings | | N |
|---|---|---|---|---|---|
| | F = 1.0000 | | f/1.8 | s' = + 0.4556 F | |
| 3b | $R_{3b}$ | = − 0.627 | $T_{3b}$ | = 0.0433 | 1.741 |
| | $R'_{3b}$ | = + 0.259 | $S_{3b}$ | = 0.2060 = CS | |
| 4 | $R_4$ | = − 0.272 | $T_4$ | = 0.0551 | 1.805 |
| | $R'_4$ | = − 0.340 | $S_4$ | = 0.0023 | |
| 5a | $R_{5a}$ | = + 0.980 | $T_{5a}$ | = 0.0844 | 1.713 |
| | $R'_{5a}$ | = − 0.431 | $S_{5a}$ | = 0.00 | |
| 5b | $R_{5b}$ | = − 0.431 | $T_{5b}$ | = 0.0289 | 1.603 |
| | $R'_{5b}$ | = − 0.809834 | | | |
| | | | OAL = 0.8027 F | | |
| | | | RML = 0.1707 F | | |

Example 2. (FIG. 2)

| Lens | Radii | | Thicknesses and Spacings | | N |
|---|---|---|---|---|---|
| | F = 1.0000 | | f/1.7 | s' = + 0.4700 F | |
| 1 | $R_1$ | = + 0.755 | $T_1$ | = 0.1155 | 1.717 |
| | $R'_1$ | = + 11.06 | $S_1$ | = 0.0024 | |
| 2 | $R_2$ | = + 0.494 | $T_2$ | = 0.1163 | 1.691 |
| | $R'_2$ | = + 1.268 | $S_2$ | = 0.0415 (β) | |
| 3 | $R_3$ | = + 4.309 | $T_3$ | = 0.1559 | 1.806 |
| | $R'_3$ | = + 0.276 | $S_3$ | = 0.1884 = CS | |
| 4 | $R_4$ | = − 0.2840 | $T_4$ | = 0.0361 | 1.755 |
| | $R'_4$ | = − 0.3257 | $S_4$ | = 0.004736 | |
| 5a | $R_{5a}$ | = + 1.3830 | $T_{5a}$ | = 0.098175 | 1.744 |
| | $R'_{5a}$ | = − 0.3257 | $S_{5a}$ | = 0.00 | |
| 5b | $R_{5b}$ | = − 0.3257 | $T_{5b}$ | = 0.0256 | 1.603 |
| | $R'_{5b}$ | = − 0.8600 | | | |
| | | | OAL = 0.784 611 F | | |
| | | | RML = 0.164 611 F | | |

Example 3. (FIG. 3)

| Lens | Radii | | Thicknesses and Spacings | | N |
|---|---|---|---|---|---|
| | F = 1.0000 | | f/1.7 | s' = + 0.4654 F | |
| 1 | $R_1$ | = + 0.6826 | $T_1$ | = 0.1356 | 1.651 |
| | $R'_1$ | = + 132.05 | $S_1$ | = 0.0014 | |
| 2 | $R_2$ | = + 0.4695 | $T_2$ | = 0.1156 | 1.651 |
| | $R'_2$ | = + 1.1055 | $S_2$ | = 0.0283 (β) | |
| 3 | $R_3$ | = + 4.3065 | $T_3$ | = 0.1415 | 1.755 |
| | $R'_3$ | = + 0.2837 | $S_3$ | = 0.2125 = CS | |
| 4a | $R_{4a}$ | = − 0.3730 | $T_{4a}$ | = 0.0153 | 1.581 |
| | $R'_{4a}$ | = + 0.7770 | $S_{4a}$ | = 0.00 | |
| 4b | $R_{4b}$ | = + 0.7770 | $T_{4b}$ | = 0.0850 | 1.744 |
| | $R'_{4b}$ | = − 0.4763 | $S_{4b}$ | = 0.0012 | |

Example 3. (FIG. 3)-continued

| Lens | Radii | | Thicknesses and Spacings | | N |
|---|---|---|---|---|---|
| | F = 1.0000 | | f/1.7 | s' = + 0.4654 F | |
| 5 | $R_5$ | = + 1.1378 | $T_5$ | = 0.0470 | 1.691 |
| | $R'_5$ | = − 1.877930 | | | |
| | | | OAL = 0.7834 F | | |
| | | | RML = 0.1485 F | | |

Example 4. (FIG. 3)

| Lens | Radii | | Thicknesses and Spacings | | N |
|---|---|---|---|---|---|
| | F = 1.0000 | | f/1.5 | s' = + 0.4510 F | |
| 1 | $R_1$ | = + 0.6812 | $T_1$ | = 0.1295 | 1.651 |
| | $R'_1$ | = ± plane | $S_1$ | = 0.0012 | |
| 2 | $R_2$ | = + 0.4652 | $T_2$ | = 0.1224 | 1.651 |
| | $R'_2$ | = + 1.0953 | $S_2$ | = 0.0294 (β) | |
| 3 | $R_3$ | = + 5.1825 | $T_3$ | = 0.1260 | 1.762 |
| | $R'_3$ | = + 0.2916 | $S_3$ | = 0.1813 = CS | |
| 4a | $R_{4a}$ | = − 0.43607 | $T_{4a}$ | = 0.0165 | 1.575 |
| | $R'_{4a}$ | = + 0.7110 | $S_{4a}$ | = 0.00 | |
| 4b | $R_{4b}$ | = + 0.7110 | $T_{4b}$ | = 0.0895 | 1.744 |
| | $R'_{4b}$ | = − 0.5072 | $S_{4b}$ | = 0.0236 | |
| 5 | $R_5$ | = + 0.9833 | $T_5$ | = 0.0624 | 1.713 |
| | $R'_5$ | = − 11.771 | | | |
| | | | OAL = 0.7818 F | | |
| | | | RML = 0.1920 F | | |

Example 5. (FIG. 4)

| Lens | Radii | | Thicknesses and Spacings | | N |
|---|---|---|---|---|---|
| | F = 1.0000 | | f/1.6 | s' = + 0.4426 F | |
| 1 | $R_1$ | = + 0.700 | $T_1$ | = 0.1400 | 1.650 |
| | $R'_1$ | = ± plane | $S_1$ | = 0.0020 | |
| 2 | $R_2$ | = + 0.490 | $T_2$ | = 0.1300 | 1.650 |
| | $R'_2$ | = + 1.400 | $S_2$ | = 0.0350 (β) | |
| 3a | $R_{3a}$ | = ± plane | $T_{3a}$ | = 0.1150 | 1.750 |
| | $R'_{3a}$ | = − 0.700 | $S_{3a}$ | = 0.00 | |
| 3b | $R_{3b}$ | = − 0.700 | $T_{3b}$ | = 0.0400 | 1.700 |
| | $R'_{3b}$ | = + 0.261 | $S_{3b}$ | = 0.1910 = CS | |
| 4 | $R_4$ | = − 0.268 | $T_4$ | = 0.0480 | 1.740 |
| | $R'_4$ | = − 0.347 | $S_4$ | = 0.0020 | |
| 5 | $R_5$ | = + 1.502 | $T_5$ | = 0.0902 | 1.720 |
| | $R'_5$ | = − 0.55108 | | | |
| | | | OAL = 0.7932 F | | |
| | | | RML = 0.1402 F | | |

Figure 5:
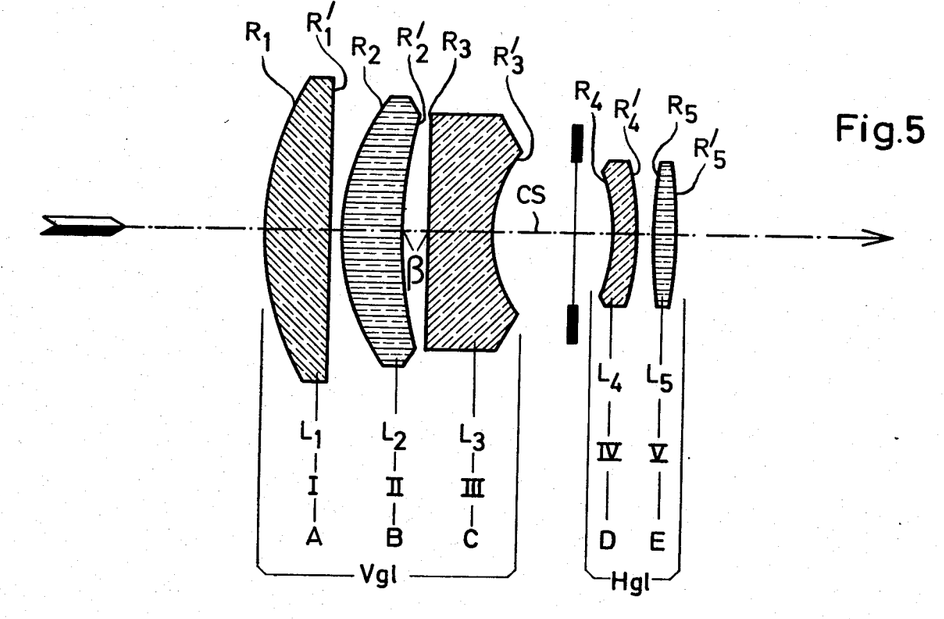
FIG. 5 is a similar diagram illustrating lenses in accordance with still other embodiments (examples 6, 7, 8, 9, and 11) of the invention.

Example 6. (FIG. 5)

| Lens | Radii | | Thicknesses and Spacings | | N | V |
|---|---|---|---|---|---|---|
| | F = 1.0000 | | f/1.5 | s' = + 0.4520 F | | |
| 1 | $R_1$ | = + 0.49217 | $T_1$ | = 0.08804 | 1.62280 | 56.93 |
| | $R'_1$ | = + 23.8013 | $S_1$ | = 0.01129 | | |
| 2 | $R_2$ | = + 0.37985 | $T_2$ | = 0.09933 | 1.62280 | 56.93 |
| | $R'_2$ | = + 0.92045 | $S_2$ | = 0.02483 (β) | | |
| 3 | $R_3$ | = + 4.23194 | $T_3$ | = 0.11611 | 1.75520 | 27.58 |
| | $R'_3$ | = + 0.21516 | $S_3$ | = 0.19565 = CS | | |
| 4 | $R_4$ | = − 0.28902 | $T_4$ | = 0.05192 | 1.62230 | 53.19 |
| | $R'_4$ | = − 0.44822 | $S_4$ | = 0.00075 | | |
| 5 | $R_5$ | = + 1.61342 | $T_5$ | = 0.03762 | 1.66672 | 48.42 |
| | $R'_5$ | = − 0.46132 | | | | |
| | | | OAL = 0.62554 F | | | |
| | | | RML = 0.09020 F | | | |

Example 7. (FIG. 5)

| Lens | Radii | | Thicknesses and Spacings | | N | V |
|---|---|---|---|---|---|---|
| | F = 1.0000 | | f/2.0 | s' = + 0.4233 F | | |
| 1 | $R_1$ | = + 0.4871 | $T_1$ | = 0.10220 | 1.62299 | 58.06 |
| | $R'_1$ | = + 205.47 | $S_1$ | = 0.00798 | | |
| 2 | $R_2$ | = + 0.3663 | $T_2$ | = 0.09842 | 1.62299 | 58.06 |
| | $R'_2$ | = + 0.8658 | $S_2$ | = 0.02205 (β) | | |
| 3 | $R_3$ | = + 4.4886 | $T_3$ | = 0.11375 | 1.75520 | 27.58 |
| | $R'_3$ | = + 0.21617 | $S_3$ | = 0.18100 = CS | | |

Example 7. (FIG. 5)-continued

| Lens | Radii | | Thicknesses and Spacings | | N | V |
|---|---|---|---|---|---|---|
| | F = 1.0000 | | f/2.0 | | s' = + 0.4233 F | |
| 4 | $R_4$ | = − 0.4408 | $T_4$ | = 0.03755 | 1.74000 | 28.20 |
| | $R'_4$ | = − 0.7105 | $S_4$ | = 0.01860 | | |
| 5 | $R_5$ | = + 1.1633 | $T_5$ | = 0.02352 | 1.64769 | 33.86 |
| | $R'_5$ | = − 0.56907 | | | | |
| | | | OAL = 0.60507 F | | | |
| | | | RML = 0.07967 F | | | |

Example 8. (FIG. 5)

| Lens | Radii | | Thicknesses and Spacings | | N | V |
|---|---|---|---|---|---|---|
| | F = 1.0000 | | f/2.0 | | s' = + 0.4552 F | |
| 1 | $R_1$ | = + 0.49465 | $T_1$ | = 0.103611 | 1.62280 | 56.93 |
| | $R'_1$ | = + 23.9213 | $S_1$ | = 0.000756 | | |
| 2 | $R_2$ | = + 0.38177 | $T_2$ | = 0.099830 | 1.62299 | 58.06 |
| | $R'_2$ | = + 0.92509 | $S_2$ | = 0.024957 ($\beta$) | | |
| 3 | $R_3$ | = + 4.01664 | $T_3$ | = 0.114956 | 1.75520 | 27.58 |
| | $R'_3$ | = + 0.21624 | $S_3$ | = 0.196635 = CS | | |
| 4 | $R_4$ | = − 0.29047 | $T_4$ | = 0.052184 | 1.62230 | 53.19 |
| | $R'_4$ | = − 0.45048 | $S_4$ | = 0.000756 | | |
| 5 | $R_5$ | = + 1.64507 | $T_5$ | = 0.037814 | 1.67003 | 47.12 |
| | $R'_5$ | = − 0.46365 | | | | |
| | | | OAL = 0.631499 F | | | |
| | | | RML = 0.090754 F | | | |

Example 9. (FIG. 5)

| Lens | Radii | | Thicknesses and Spacings | | N | V |
|---|---|---|---|---|---|---|
| | F = 1.0000 | | f/2.0 | | s' = + 0.4387 F | |
| 1 | $R_1$ | = + 0.49593 | $T_1$ | = 0.99330 | 1.62280 | 56.93 |
| | $R'_1$ | = ± plane | $S_1$ | = 0.001516 | | |
| 2 | $R_2$ | = + 0.37189 | $T_2$ | = 0.098572 | 1.62280 | 56.93 |
| | $R'_2$ | = + 0.88834 | $S_2$ | = 0.020473 ($\beta$) | | |
| 3 | $R_3$ | = + 3.96836 | $T_3$ | = 0.117528 | 1.75520 | 27.58 |
| | $R'_3$ | = + 0.21523 | $S_3$ | = 0.194870 = CS | | |
| 4 | $R_4$ | = − 0.38552 | $T_4$ | = 0.028055 | 1.65113 | 55.89 |
| | $R'_4$ | = − 0.67092 | $S_4$ | = 0.013648 | | |
| 5 | $R_5$ | = + 1.49124 | $T_5$ | = 0.041704 | 1.68273 | 44.51 |
| | $R'_5$ | = − 0.48884 | | | | |
| | | | OAL = 0.615696 F | | | |
| | | | RML = 0.083407 F | | | |

Example 10. (Fig. 4)

| Lens | Radii | | Thicknesses and Spacings | | N | V |
|---|---|---|---|---|---|---|
| | F = 1.0000 | | f/1.4 | | s' = + 0.4415 F | |
| 1 | $R_1$ | = + 0.68028 | $T_1$ | = 0.138703 | 1.65160 | 58.49 |
| | $R'_1$ | = + 14.3757 | $S_1$ | = 0.002351 | | |
| 2 | $R_2$ | = + 0.48509 | $T_2$ | = 0.128124 | 1.65160 | 58.49 |
| | $R'_2$ | = + 1.32841 | $S_2$ | = 0.032912 ($\beta$) | | |
| 3a | $R_{3a}$ | = + 12.1071 | $T_{3a}$ | = 0.115194 | 1.74950 | 34.94 |
| | $R'_{3a}$ | = − 0.65625 | $S_{3a}$ | = 0.00 | | |
| 3b | $R_{3b}$ | = − 0.65625 | $T_{3b}$ | = 0.039965 | 1.69895 | 30.06 |
| | $R'_{3b}$ | = + 0.25752 | $S_{3b}$ | = 0.197475 = CS | | |
| 4 | $R_4$ | = − 0.26696 | $T_4$ | = 0.045842 | 1.74000 | 28.20 |
| | $R'_4$ | = − 0.34593 | $S_4$ | = 0.002351 | | |
| 5 | $R_5$ | = + 1.50129 | $T_5$ | = 0.088158 | 1.72000 | 50.42 |
| | $R'_5$ | = − 0.54823 | | | | |
| | | | OAL = 0.791075 F | | | |
| | | | RML = 0.136351 F | | | |

Example 11. (FIG. 5)

| Lens | Radii | | Thicknesses and Spacings | | N | V |
|---|---|---|---|---|---|---|
| | F = 1.0000 | | f/1.4 | | s' = + 0.4593 F | |
| 1 | $R_1$ | = + 0.61147 | $T_1$ | = 0.146058 | 1.71300 | 53.85 |
| | $R'_1$ | = + 7.16432 | $S_1$ | = 0.001753 | | |
| 2 | $R_2$ | = + 0.47530 | $T_2$ | = 0.094879 | 1.71300 | 53.85 |
| | $R'_2$ | = + 0.96200 | $S_2$ | = 0.032483 ($\beta$) | | |
| 3 | $R_3$ | = + 3.80300 | $T_3$ | = 0.137294 | 1.76180 | 26.95 |
| | $R'_3$ | = + 0.26920 | $S_3$ | = 0.203312 = CS | | |
| 4 | $R_4$ | = − 0.37217 | $T_4$ | = 0.077119 | 1.80518 | 25.43 |

Example 11. (FIG. 5)-continued

| Lens | Radii | | Thicknesses and Spacings | | s' = + 0.4593 F N | V |
|---|---|---|---|---|---|---|
| | | F = 1.0000 | | f/1.4 | | |
| | R'₄ | = − 0.48568 | S₄ | = 0.003622 | | |
| 5 | R₅ | = + 1.01184 | T₅ | = 0.058423 | 1.71300 | 53.85 |
| | R'₅ | = − 0.80374 | | | | |
| | | | OAL | = 0.754943 F | | |
| | | | RML | = 0.139164 F | | |

In connection with this invention, the lenses disclosed in the following German patents and United States patents have been taken into consideration: German Pat. Nos. 428,657, 665,520; German Auslegeschrift No. 1,797,212; and U.S. Pat. Nos. 2,677,989, 2,720,139, 2,733,636, 2,807,983, and 2,826,116.

Also consideration has been given to lens designs without an air lens $\beta$, in accordance with the following U.S. Pat. Nos. 2,487,749, 2,499,264, 2,831,395, and 2,968,221.

The numerical values for the various features above identified as features 1 through 7 can all be calculated mathematically from the numerical data given in the foregoing specified examples 1 through 11. The calculated values are given in the following table, the vertical columns representing the various features as individually numbered above, and the horizontal lines corresponding to the respective examples 1-11. For convenience, the limits previously stated near the beginning of the specification are indicated in a line below example 11, and it will be noted that the specific calculated values are in every case within the stated limits, except for features 6 and 7 which are intended to apply only to certain embodiments of the invention (checked in columns 6 and 7) and not to all of the embodiments.

Numerical values of features of the specific examples

| Ex. | f/... | Feature (1) $\Phi_{Vgl}$ | (2) $-\phi_\beta$ | (3a) $\delta_B$ | (3b) $\phi_B$ |
|---|---|---|---|---|---|
| 1 | 1.8 | +0.3853Φ | 0.4342Φ | +2.3476 | +0.8223Φ |
| 2 | 1.7 | +0.3086Φ | 0.3579Φ | +2.2765 | +0.8538Φ |
| 3 | 1.7 | +0.4071Φ | 0.4136Φ | +2.4764 | +0.7977Φ |
| 4 | 1.5 | +0.4170Φ | 0.4473Φ | +2.4766 | +0.8050Φ |
| 5 | 1.6 | +0.4310Φ | 0.4643Φ | +2.0769 | +0.8622Φ |
| 6 | 1.5 | +0.4753Φ | 0.4982Φ | +2.4053 | +0.9630Φ |
| 7 | 2.0 | +0.5499Φ | 0.5513Φ | +2.4463 | +0.9810Φ |
| 8 | 2.0 | +0.4725Φ | 0.4854Φ | +2.4053 | +0.9584Φ |
| 9 | 2.0 | +0.4986Φ | 0.5108Φ | +2.4402 | +0.9736Φ |
| 10 | 1.4 | +0.4335Φ | 0.4286Φ | +2.1504 | +0.8527Φ |
| 11 | 1.4 | +0.4475Φ | 0.5409Φ | +2.9532 | +0.7590Φ |
| Limit.: | | >0.28Φ <0.61Φ | >0.326Φ <0.612Φ | >+1.735 <+3.675 | <1.070Φ >0.690Φ |

| Ex. | f/... | Feature (4) $\Psi_{BA}$ | (5) $\delta_B$ | (6) $\phi_A$ | (7) $\Phi_D$ |
|---|---|---|---|---|---|
| 1 | 1.8 | −0.0836 | +1.4374 | +0.9724Φ | −0.3779Φ |
| 2 | 1.7 | −0.0178 | +1.8339 | +0.8848Φ | −0.2136Φ |
| 3 | 1.7 | −0.0865 | +1.6907 | +0.9488Φ | +0.3433Φ |
| 4 | 1.5 | −0.0855 | +1.5360 | +0.9557Φ | +0.4906Φ |
| 5 | 1.6 | −0.0370 | +1.0000 | +0.9286Φ | −0.4662Φ |
| 6 | 1.5 | −0.1255 | +1.5559 | +1.2393Φ | −0.6691Φ |
| 7 | 2.0 | −0.1306 | +1.4780 | +1.2759Φ | −0.5996Φ |
| 8 | 2.0 | −0.1253 | +1.5985 | +1.2330Φ | −0.6653Φ |
| 9 | 1.0 | −0.1266 | +1.5768 | +1.2558Φ | −0.6906Φ |
| 10 | 1.4 | −0.0339 | +1.2465 | +0.9125Φ | −0.4766Φ |
| 11 | 1.4 | −0.1685 | +1.6677 | +1.0665Φ | −0.3524Φ |
| Limit.: | | ≧− 0 −<0.205 | >+0.834 <+2.285 | >1.045Φ | −>0.546Φ − <0.767Φ |

What is claimed is:

1. A high speed lens having a short back focus and a compact rear member, said lens having at least five components formed into a front member of at least three components and a rear member of at least two components separated from the front member by a diaphragm space, the components being identified herein consecutively from front to rear by the letters A through E, the first three components A, B, and C being air spaced from each other, components A and B both being positive components with condensing refractive power, component C having negative power and having a rear surface which is concave toward the rear, said front member is a whole having a condensing action, the rear member behind said diaphragm space having a first component D whose front surface is concave toward the front of the lens, said rear member also having a rearmost component E having positive power, said components being so constructed that they fulfill simultaneously all of the following conditions:

a. the paraxial refractive power ($\Phi_{Vgl}$) of the front member (Vgl) is positive and is within the range of 0.28 times to 0.61 times the equivalent refractive power ($\Phi$) of the entire lens;

b. a diverging air lens $\beta$ is formed between components B and C and is so dimensioned that the sum of the surface refractive powers of the neighboring surfaces defining the air lens ($\phi_\beta$) has a negative value within the range of 0.326 times to 0.612 times the equivalent refractive power ($\Phi$) of the entire lens;

c. the positive component B is a meniscus convex toward the front of the lens, this component B having a Gardner curvature number ($\delta_B$) which is positive and within the range of 2.0769 to 2.9532, this component B also having a surface power sum ($\phi_B$) within the range of 0.690 times to 1.070 times the equivalent refractive power ($\Phi$) of the entire lens;

d. components A and B are so dimensioned relative to each other that their refractive power distribution factor ($\Psi_{BA}$) constituting the quotient of the difference of their surface power sums ($\phi_B - \phi_A$) divided by the sum of their surface power sums ($\phi_B + \phi_A$) is within the range from zero to 0.205; and e. the air lens $\beta$ is so dimensioned that its Gardner curvature number is in a finite region of position having a positive sign with a numerical value within the range from + 1.0000 to + 1.8339.

2. A lens as defined in claim 1, wherein the component A has a surface power sum ($\phi_A$) which is within the range of 1.0665 and 1.2759 times the equivalent refractive power ($\Phi$) of the entire lens.

3. A lens as defined in claim 1, wherein the front component D of the rear member has a paraxial refractive power ($\Phi_D$) which in its negative value is in the range of 0.546 times to 0.767 times the equivalent refractive power ($\Phi$) of the entire lens.

4. A lens as defined in claim 1, wherein the characteristics of the lens components and their spatial relationship to each other are substantially in the proportions indicated by the data in the following table:

| Lens | Radii | | Thicknesses and Spacings | | N |
|---|---|---|---|---|---|
| 1 | $R_1$ | $= +0.60$ | $T_1$ | $= 0.137$ | 1.651 |
|  | $R'_1$ | $= +5.43$ | $S_1$ | $= 0.002$ |  |
| 2 | $R_2$ | $= +0.47$ | $T_2$ | $= 0.116$ | 1.651 |
|  | $R'_2$ | $= +1.18$ | $S_2$ | $= 0.30\ (\beta)$ |  |
| 3a | $R_{3a}$ | $= +6.55$ | $T_{3a}$ | $= 0.098$ | 1.785 |
|  | $R'_{3a}$ | $= -0.63$ | $S_{3a}$ | $= 0.000$ |  |
| 3b | $R_{3b}$ | $= -0.63$ | $T_{3b}$ | $= 0.043$ | 1.741 |
|  | $R'_{3b}$ | $= +0.26$ | $S_{3b}$ | $= 0.206 = CS$ |  |
| 4 | $R_4$ | $= -0.27$ | $T_4$ | $= 0.055$ | 1.805 |
|  | $R'_4$ | $= -0.34$ | $S_4$ | $= 0.002$ |  |
| 5a | $R_{5a}$ | $= +0.98$ | $T_{5a}$ | $= 0.084$ | 1.713 |
|  | $R'_{5a}$ | $= -0.43$ | $S_{5a}$ | $= 0.000$ |  |
| 5b | $R_{5b}$ | $= -0.43$ | $T_{5b}$ | $= 0.029$ | 1.603 |
|  | $R'_{5b}$ | $= -0.81$ |  |  |  | wherein all linear dimensions of radii, thicknesses, and spacings are expressed in proportion to the equivalent focal length of the entire lens system, which is considered as unity.

5. A lens as defined in claim 1, wherein the characteristics of the lens components and their spatial relationship to each other are substantially in the proportions indicated by the data in the following table:

| Lens | Radii | | Thicknesses and Spacings | | N |
|---|---|---|---|---|---|
| 1 | $R_1$ | $= +0.755$ | $T_1$ | $= 0.116$ | 1.717 |
|  | $R'_1$ | $= +11.06$ | $S_1$ | $= 0.002$ |  |
| 2 | $R_2$ | $= +0.494$ | $T_2$ | $= 0.116$ | 1.691 |
|  | $R'_2$ | $= +1.268$ | $S_2$ | $= 0.042\ (\beta)$ |  |
| 3 | $R_3$ | $= +4.309$ | $T_3$ | $= 0.156$ | 1.806 |
|  | $R'_3$ | $= +0.276$ | $S_3$ | $= 0.188 = CS$ |  |
| 4 | $R_4$ | $= -0.284$ | $T_4$ | $= 0.036$ | 1.755 |
|  | $R'_4$ | $= -0.326$ | $S_4$ | $= 0.005$ |  |
| 5a | $R_{5a}$ | $= +1.383$ | $T_{5a}$ | $= 0.098$ | 1.744 |
|  | $R'_{5a}$ | $= -0.326$ | $S_{5a}$ | $= 0.000$ |  |
| 5b | $R_{5b}$ | $= -0.326$ | $T_{5b}$ | $= 0.026$ | 1.603 |
|  | $R'_{5b}$ | $= -0.8600$ |  |  |  | wherein all linear dimensions of radii, thicknesses, and spacings are expressed in proportion to the equivalent focal length of the entire lens system, which is considered as unity.

6. A lens as defined in claim 1, wherein the characteristics of the lens components and their spatial relationship to each other are substantially in the proportions indicated by the data in the following table:

| Lens | Radii | | Thicknesses and Spacings | N |
|---|---|---|---|---|
| 1 | $R_1$ | $= +0.683$ | $T_1 = 0.136$ | 1.651 |
|  | $R'_1$ | $= +132.1$ | $S_1 = 0.001$ |  |
| 2 | $R_2$ | $= +0.470$ | $T_2 = 0.116$ | 1.651 |
|  | $R'_2$ | $= +1.106$ | $S_2 = 0.028\ (\beta)$ |  |
| 3 | $R_3$ | $= +4.307$ | $T_3 = 0.142$ | 1.755 |
|  | $R'_3$ | $= +0.284$ | $S_3 = 0.213 = CS$ |  |
| 4a | $R_{4a}$ | $= -0.373$ | $T_{4a} = 0.015$ | 1.581 |
|  | $R'_{4a}$ | $= +0.777$ | $S_{4a} = 0.000$ |  |
| 4b | $R_{4b}$ | $= +0.777$ | $T_{4b} = 0.085$ | 1.744 |
|  | $R'_{4b}$ | $= -0.476$ | $S_{4b} = 0.001$ |  |
| 5 | $R_5$ | $= +1.138$ | $T_5 = 0.047$ | 1.691 |
|  | $R'_5$ | $= -1.878$ |  |  | wherein all linear dimensions of radii, thicknesses, and spacings are expressed in proportion to the equivalent focal length of the entire lens system, which is considered as unity.

7. A lens as defined in claim 1, wherein the characteristics of the lens components and their spatial relationship to each other are substantially in the proportions indicated by the data in the following table:

| Lens | Radii | | Thicknesses and Spacings | N |
|---|---|---|---|---|
| 1 | $R_1$ | $= +0.681$ | $T_1 = 0.130$ | 1.651 |
|  | $R'_1$ | $= \pm$ plane | $S_1 = 0.001$ |  |
| 2 | $R_2$ | $= +0.465$ | $T_2 = 0.122$ | 1.651 |
|  | $R'_2$ | $= +1.095$ | $S_2 = 0.029\ (\beta)$ |  |
| 3 | $R_3$ | $= +5.183$ | $T_3 = 0.126$ | 1.762 |
|  | $R'_3$ | $= +0.292$ | $S_3 = 0.1813 = CS$ |  |
| 4a | $R_{4a}$ | $= -0.436$ | $T_{4a} = 0.017$ | 1.575 |
|  | $R'_{4a}$ | $= +0.711$ | $S_{4a} = 0.000$ |  |
| 4b | $R_{4b}$ | $= +0.711$ | $T_{4b} = 0.090$ | 1.744 |
|  | $R'_{4b}$ | $= -0.507$ | $S_{4b} = 0.024$ |  |
| 5 | $R_5$ | $= +0.983$ | $T_5 = 0.062$ | 1.713 |
|  | $R'_5$ | $= -11.77$ |  |  | wherein all linear dimensions of radii, thicknesses, and spacings are expressed in proportion to the equivalent focal length of the entire lens system, which is considered as unity.

8. A lens as defined in claim 1, wherein the characteristics of the lens components and their spatial relationship to each other are substantially in the proportions indicated by the data in the following table:

| Lens | Radii | | Thicknesses and Spacings | | N |
|---|---|---|---|---|---|
| 1 | $R_1$ | $= +0.700$ | $T_1$ | $= 0.140$ | 1.650 |
|  | $R'_1$ | $= \pm$ plane | $S_1$ | $= 0.002$ |  |
| 2 | $R_2$ | $= +0.490$ | $T_2$ | $= 0.130$ | 1.650 |
|  | $R'_2$ | $= +1.400$ | $S_2$ | $= 0.035\ (\beta)$ |  |
| 3a | $R_{3a}$ | $= \pm$ plane | $T_{3a}$ | $= 0.115$ | 1.750 |
|  | $R'_{3a}$ | $= -0.700$ | $S_{3a}$ | $= 0.000$ |  |
| 3b | $R_{3b}$ | $= -0.700$ | $T_{3b}$ | $= 0.040$ | 1.700 |
|  | $R'_{3b}$ | $= +0.261$ | $S_{3b}$ | $= 0.191 = CS$ |  |
| 4 | $R_4$ | $= -0.268$ | $T_4$ | $= 0.048$ | 1.740 |
|  | $R'_4$ | $= -0.347$ | $S_4$ | $= 0.002$ |  |
| 5 | $R_5$ | $= +1.502$ | $T_5$ | $= 0.090$ | 1.720 |
|  | $R'_5$ | $= -0.551$ |  |  |  | wherein all linear dimensions of radii, thicknesses, and spacings are expressed in proportion to the equivalent focal length of the entire lens system, which is considered as unity.

9. A lens as defined in claim 1, wherein the characteristics of the lens components and their spatial relationship to each other are substantially in the proportions indicated by the data in the following table:

| Lens | Radii | | Thicknesses and Spacings | | N | V |
|---|---|---|---|---|---|---|
| 1 | $R_1$ | $= +0.492$ | $T_1$ | $= 0.0880$ | 1.6228 | 56.93 |
|  | $R'_1$ | $= +23.80$ | $S_1$ | $= 0.0113$ |  |  |
| 2 | $R_2$ | $= +0.380$ | $T_2$ | $= 0.0993$ | 1.6228 | 56.93 |
|  | $R'_2$ | $= +0.920$ | $S_2$ | $= 0.0248\ (\beta)$ |  |  |
| 3 | $R_3$ | $= +4.232$ | $T_3$ | $= 0.1161$ | 1.7552 | 27.58 |
|  | $R'_3$ | $= +0.215$ | $S_3$ | $= 0.1957 = CS$ |  |  |
| 4 | $R_4$ | $= -0.289$ | $T_4$ | $= 0.0519$ | 1.6223 | 53.19 |
|  | $R'_4$ | $= -0.448$ | $S_4$ | $= 0.0008$ |  |  |
| 5 | $R_5$ | $= +1.613$ | $T_5$ | $= 0.0376$ | 1.6667 | 48.42 |
|  | $R'_5$ | $= -0.461$ |  |  |  |  | wherein all linear dimensions of radii, thicknesses, and spacings are expressed in proportion to the equivalent focal length of the entire lens system, which is considered as unity.

10. A lens as defined in claim 1, wherein the characteristics of the lens components and their spatial relationship to each other are substantially in the proportions indicated by the data in the following table:

| Lens | Radii | Thicknesses and Spacings | N | V |
|---|---|---|---|---|
| 1 | $R_1 = +0.487$ | $T_1 = 0.1022$ | 1.6230 | 58.06 |
|   | $R'_1 = +.205.5$ | $S_1 = 0.0080$ |   |   |
| 2 | $R_2 = +0.366$ | $T_2 = 0.0984$ | 1.6230 | 58.06 |
|   | $R'_2 = +0.866$ | $S_2 = 0.0221\ (\beta)$ |   |   |
| 3 | $R_3 = +4.489$ | $T_3 = 0.1138$ | 1.7552 | 27.58 |
|   | $R'_3 = +0.216$ | $S_3 = 0.1810 = CS$ |   |   |
| 4 | $R_4 = -0.441$ | $T_4 = 0.0376$ | 1.7400 | 28.20 |
|   | $R'_4 = -0.711$ | $S_4 = 0.0186$ |   |   |
| 5 | $R_5 = +1.163$ | $T_5 = 0.0235$ | 1.6477 | 33.86 |
|   | $R'_5 = -0.569$ |   |   |   | wherein all linear dimensions of radii, thicknesses, and spacings are expressed in proportion to the equivalent focal length of the entire lens system, which is considered as unity.

11. A lens as defined in claim 1, wherein the characteristics of the lens components and their spatial relationship to each other are substantially in the proportions indicated by the data in the following table:

| Lens | Radii | Thicknesses and Spacings | N | V |
|---|---|---|---|---|
| 1 | $R_1 = +0.4947$ | $T_1 = 0.1036$ | 1.6228 | 56.93 |
|   | $R'_1 = +23.921$ | $S_1 = 0.0008$ |   |   |
| 2 | $R_2 = +0.3818$ | $T_2 = 0.0998$ | 1.6230 | 58.06 |
|   | $R'_2 = +0.9251$ | $S_2 = 0.0250\ (\beta)$ |   |   |
| 3 | $R_3 = +4.0166$ | $T_3 = 0.1150$ | 1.7552 | 27.58 |
|   | $R'_3 = +0.2162$ | $S_3 = 0.1966 = CS$ |   |   |
| 4 | $R_4 = -0.2905$ | $T_4 = 0.0522$ | 1.6223 | 53.19 |
|   | $R'_4 = -0.4505$ | $S_4 = 0.0008$ |   |   |
| 5 | $R_5 = +1.6451$ | $T_5 = 0.0378$ | 1.6700 | 47.12 |
|   | $R'_5 = -0.4637$ |   |   |   | wherein all linear dimensions of radii, thicknesses, and spacings are expressed in proportion to the equivalent focal length of the entire lens system, which is considered as unity.

12. A lens as defined in claim 1, wherein the characteristics of the lens components and their spatial relationship to each other are substantially in the proportions indicated by the data in the following table:

| Lens | Radii | Thicknesses and Spacings | N | V |
|---|---|---|---|---|
| 1 | $R_1 = +0.496$ | $T_1 = 0.0993$ | 1.6228 | 56.93 |
|   | $R'_1 = \pm\text{plane}$ | $S_1 = 0.0015$ |   |   |
| 2 | $R_2 = +0.372$ | $T_2 = 0.0986$ | 1.6228 | 56.93 |
|   | $R'_2 = +0.888$ | $S_2 = 0.0205\ (\beta)$ |   |   |
| 3 | $R_3 = +3.968$ | $T_3 = 0.1175$ | 1.7552 | 27.58 |
|   | $R'_3 = +0.215$ | $S_3 = 0.1949 = CS$ |   |   |
| 4 | $R_4 = -0.386$ | $T_4 = 0.0281$ | 1.6511 | 55.89 |
|   | $R'_4 = -0.671$ | $S_4 = 0.0136$ |   |   |
| 5 | $R_5 = +1.491$ | $T_5 = 0.0417$ | 1.6827 | 44.51 |
|   | $R'_5 = -0.489$ |   |   |   | wherein all linear dimensions of radii, thicknesses, and spacings are expressed in proportion to the equivalent focal length of the entire lens system, which is considered as unity.

13. A lens as defined in claim 1, wherein the characteristics of the lens components and their spatial relationship to each other are substantially in the proportions indicated by the data in the following table:

| Lens | Radii | Thicknesses and Spacings | N | V |
|---|---|---|---|---|
| 1 | $R_1 = +0.680$ | $T_1 = 0.1387$ | 1.6516 | 58.49 |
|   | $R'_1 = +14.38$ | $S_1 = 0.0024$ |   |   |
| 2 | $R_2 = +0.485$ | $T_2 = 0.1281$ | 1.6516 | 58.49 |
|   | $R'_2 = +1.328$ | $S_2 = 0.0329\ (\beta)$ |   |   |
| 3a | $R_{3a} = +12.11$ | $T_{3a} = 0.1152$ | 1.7495 | 34.94 |
|   | $R'_{3a} = -0.656$ | $S_{3a} = 0.0000$ |   |   |
| 3b | $R_{3b} = -0.656$ | $T_{3b} = 0.0400$ | 1.6990 | 30.06 |
|   | $R'_{3b} = +0.258$ | $S_{3b} = 0.1975 = CS$ |   |   |
| 4 | $R_4 = -0.267$ | $T_4 = 0.0458$ | 1.7400 | 28.20 |
|   | $R'_4 = -0.346$ | $S_4 = 0.0024$ |   |   |
| 5 | $R_5 = +1.501$ | $T_5 = 0.0882$ | 1.7200 | 50.42 |
|   | $R'_5 = -0.548$ |   |   |   | wherein all linear dimensions of radii, thicknesses, and spacings are expressed in proportion to the equivalent focal length of the entire lens system, which is considered as unity.

14. A lens as defined in claim 1, wherein the characteristics of the lens components and their spatial relationship to each other are substantially in the proportions indicated by the data in the following table:

| Lens | Radii | Thicknesses and Spacings | N | V |
|---|---|---|---|---|
| 1 | $R_1 = +0.611$ | $T_1 = 0.1461$ | 1.7130 | 53.85 |
|   | $R'_1 = +7.164$ | $S_1 = 0.0018$ |   |   |
| 2 | $R_2 = +0.475$ | $T_2 = 0.0949$ | 1.7130 | 53.85 |
|   | $R'_2 = +0.962$ | $S_2 = 0.0325\ (\beta)$ |   |   |
| 3 | $R_3 = +3.803$ | $T_3 = 0.1373$ | 1.7618 | 26.95 |
|   | $R'_3 = +0.269$ | $S_3 = 0.2033 = CS$ |   |   |
| 4 | $R_4 = -0.372$ | $T_4 = 0.0771$ | 1.8052 | 25.43 |
|   | $R'_4 = -0.486$ | $S_4 = 0.0036$ |   |   |
| 5 | $R_5 = +1.012$ | $T_5 = 0.0584$ | 1.7130 | 53.85 |
|   | $R'_5 = -0.804$ |   |   |   | wherein all linear dimensions of radii, thicknesses, and spacings are expressed in proportion to the equivalent focal length of the entire lens system, which is considered as unity.

* * * * *